(12) United States Patent
Will

(10) Patent No.: US 7,038,578 B2
(45) Date of Patent: May 2, 2006

(54) FAULT REPORTING SYSTEM FOR A MOTOR VEHICLE

(75) Inventor: Peter Will, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/399,481

(22) PCT Filed: Oct. 12, 2001

(86) PCT No.: PCT/EP01/11808

§ 371 (c)(1),
(2), (4) Date: Sep. 9, 2003

(87) PCT Pub. No.: WO02/34577

PCT Pub. Date: May 2, 2002

(65) Prior Publication Data

US 2004/0036588 A1  Feb. 26, 2004

(30) Foreign Application Priority Data

Oct. 21, 2000 (DE) .............................. 100 52 307

(51) Int. Cl.
*B60Q 1/00* (2006.01)
(52) U.S. Cl. .................. 340/439; 340/438; 340/445
(58) Field of Classification Search ................ 340/438, 340/449, 450, 451, 439, 440, 441, 453, 450.1, 340/450.2, 450.3, 452; 701/29–35
See application file for complete search history.

(56) References Cited

U.S. PATENT DOCUMENTS

| | | | | |
|---|---|---|---|---|
| 4,020,481 A | * | 4/1977 | Nakagawa | 340/624 |
| 5,382,942 A | * | 1/1995 | Raffa et al. | 340/457.4 |
| 5,473,938 A | * | 12/1995 | Handfield et al. | 73/146.5 |
| 5,555,171 A | * | 9/1996 | Sonehara et al. | 701/33 |
| 5,783,993 A | * | 7/1998 | Briski et al. | 340/525 |
| 5,825,287 A | * | 10/1998 | Zarybnicky et al. | 340/453 |
| 5,880,710 A | * | 3/1999 | Jaberi et al. | 345/618 |
| 6,012,004 A | * | 1/2000 | Sugano et al. | 701/33 |
| 6,289,332 B1 | * | 9/2001 | Menig et al. | 707/1 |
| 6,429,845 B1 | * | 8/2002 | Unseld et al. | 345/618 |
| 6,553,290 B1 | * | 4/2003 | Pillar | 701/33 |
| 2003/0058089 A1 | * | 3/2003 | Ruehr et al. | 340/442 |

FOREIGN PATENT DOCUMENTS

| | | |
|---|---|---|
| DE | 2 338 944 | 8/1973 |
| DE | 25 35 143 | 8/1975 |
| DE | 197 00 353 A1 | 1/1997 |
| DE | 197 35 017 A1 | 8/1997 |

(Continued)

*Primary Examiner*—Thomas J. Mullen, Jr.
*Assistant Examiner*—Son Tang
(74) *Attorney, Agent, or Firm*—Crowell & Moring LLP

(57) ABSTRACT

A defect reporting system for a vehicle having at least one electronic control unit, includes a check-control module that is connected with the at least one control unit and receives a report from the latter. An indicating device is connected with the check-control module, for displaying at least one information as a function of the transmitted report. The at least one control unit is configured such that it can independently evaluate reporting conditions and, upon the occurrence of predetermined situations, can emit a corresponding malfunction report to the check-control module. A table in which the at least one information is stored for each report is accessible by the check-control module, whereby the at least one information assigned to the report can be read out and shown by way of the indicating device.

21 Claims, 1 Drawing Sheet

FOREIGN PATENT DOCUMENTS

| | | |
|---|---|---|
| DE | 198 12 318 A1 | 3/1998 |
| DE | 198 39 310 A1 | 8/1998 |
| DE | 199 19 216 A | 4/1999 |
| DE | 199 41 973 A1 | 9/1999 |
| EP | 0 903 264 A1 | 3/1999 |
| EP | 0 949 122 A2 | 10/1999 |
| GB | 2 345 276 A | 12/1998 |
| WO | WO 97/13657 | 4/1997 |

* cited by examiner

FAULT REPORTING SYSTEM FOR A MOTOR VEHICLE

This application claims the priority of German patent document 100 52 307.2, filed 21 Oct. 2000 (PCT/EP01/ 11808 filed 12 Oct. 2001), the disclosure of which is expressly incorporated by reference herein.

BACKGROUND AND SUMMARY OF THE INVENTION

The invention relates to a malfunction reporting system for a vehicle.

Conventionally, malfunctions in a vehicle are indicated by a symbol in a display. To implement this function, a central check-control module is frequently provided in vehicles, and is connected with different electrical control units (which control respective vehicle systems) by way of a data bus. In some cases, several so-called bus identifiers are assigned to each control unit; and status bits containing information regarding operation of the associated vehicle system are transmitted from the control units to the check-control module, and evaluated there. If necessary, the status bits are linked with additional data. When certain conditions are present, a defect report is emitted in the indicating device in the vehicle, for example, in the instrument cluster.

Low flexibility is a disadvantage of this system, because the check-control module must recognize all status messages. Furthermore, the conditions under which defect reports should be indicated also have to be filed in the check-control module. For this reason, changes in the control units always also cause changes in the check-control module itself. In addition, for communication by way of a data bus, in some cases, several bus identifiers are required for the different control units, which increases the complexity of the overall system. In this respect, the required computing speed in the check-control module rises proportionately with the number of required reports. In addition, the number of available bus identifiers in the bus systems is limited so that, when multiple complex electrical control units are used, a limit is reached with respect to the reports which can be indicated.

Furthermore, heretofore only illuminated symbols have generally been shown in an indicating device for indicating a defect. In the case of symbols that are activated infrequently, a driver must often consult the operating instructions to learn the meaning of the symbol alone (that is, without any explanation).

It is an object of the present invention to provide a flexible defect reporting system for a vehicle which can accommodate the increasing number of reports in future vehicles.

This and other objects and advantages are achieved by the defect reporting system according to the invention, in which the control units are configured to independently evaluate reporting conditions, and to issue a corresponding report to a check-control module when defined failure conditions exist. That is, in contrast to conventional systems, in which only status bits are transmitted to the check-control module describing only the status and various vehicle operating conditions, according to the invention the control unit itself independently evaluates the reports submitted to it and, if defined conditions are present (which must of course therefore be available to the respective control unit), it formulates a corresponding report to the check-control module.

Furthermore, the check-control module has access to a table in which, for each report from a control unit, at least one unit of information is filed, which must then be shown via the indicating device. The check-control module reads from the table the information assigned to the transmitted report, and shows this table by means of the indicating device. A combination indicating device may be used, which preferably also comprises a display. Different symbols and text information can be shown in the display. In addition, it is also possible to control different indicator lights in the combination indicating device, depending on the defect.

Because of the checking of the reporting conditions in the control units themselves, when the data are transmitted by way of a data bus, it is not necessary to use several bus identifiers. Bus identifiers are essentially data which describe the type of information being transmitted via the data bus. In the case of the present invention, it would, for example, be possible to transmit all defects in a certain data format, so that only one bus identifier would then be required. As soon as a report with the bus identifier for a defect report is present on the bus, the check-control module will know that this report contains defect information that has to be processed. Naturally, several bus identifiers for different groups of reports may also be selected.

The respective data formats then each contain one defect report part which comprises a statement which corresponds to the defect detected by a control unit on the basis of the presence of particular conditions.

The report from a control unit therefore preferably comprises the bus identifier and report information. This approach permits the use of the defect reporting system according to the invention when multiple complex electronic control units are operated.

By using a table, in which essentially an assignment of reports originating from a control unit and assigned information is present, it becomes unnecessary to exchange the check-control module or to have to reprogram it to modify its method of operation, when the control units or the defect messages in the control units are changed. Rather, it is sufficient to exchange the information filed in the table (for example, by flash programming) and to correspondingly adapt this information when the system is changed.

Such an adaptation can be performed in a simple manner, first preparing the table by means of a data bank. From this data bank, a source code data file and therefrom a machine-readable data file can be formed, which is programmed into a memory containing the table.

A separate memory can be used for the table, so that when the table must be changed, a new table needs only be read into the memory.

Alternatively, the program part, provided for the operation of the check-control module, and the data part containing the information of the table, may also be constructed as an integrated unit. In this case, the two program parts should be prepared jointly, and newly read into the memory.

The memory may be constructed as a part of the check-control module itself; or the check-control module and the memory may be jointly integrated in an instrument cluster. Other alternatives are of course possible.

For each report, the table can keep on file a plurality of information in the form of texts, graphic information, indicator light activations and/or other reporting action.

By means of the defect reporting system according to the invention, and in particular the self-evaluating control units and the separately filed table, an extremely flexible system is created.

Other objects, advantages and novel features of the present invention will become apparent from the following detailed description of the invention when considered in conjunction with the accompanying drawings.

DETAILED DESCRIPTION OF THE DRAWINGS

Figure 1:
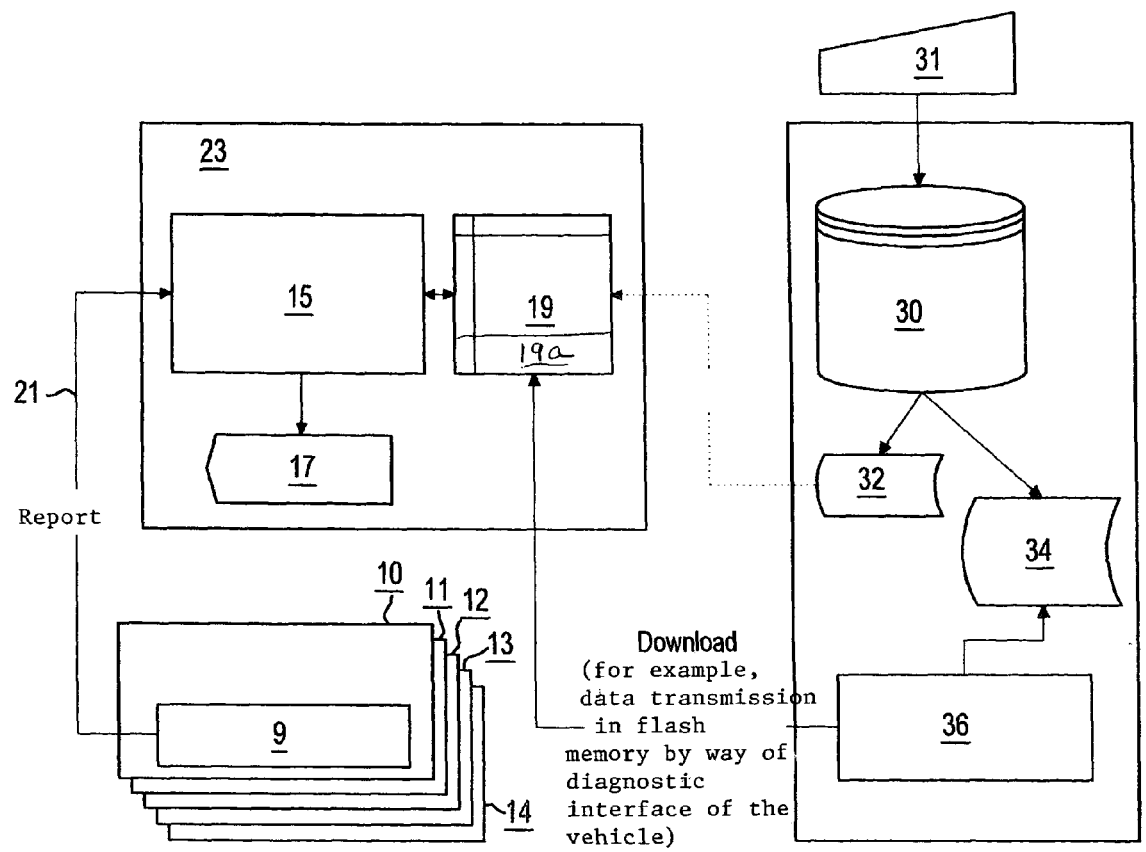
FIG. 1 is a schematic block diagram of a defect reporting system according to the present invention.

In the schematic block diagram of FIG. 1, five control units 10 to 14 are indicated, each including a unit 9 for analyzing reporting conditions regarding operation of a controlled system associated therewith. The units 9 obtain status data from the respective control units 10 to 14, and examine the entirety of the available information using stored criteria for each control unit. Naturally, for judging whether these criteria have been satisfied, other factors may be entered which are fed from outside the control unit.

When a reporting criterion in a control unit 10 to 14 has been met, that control unit emits a corresponding report via a data bus 21 to a check-control module 15, which is part of an instrument cluster 23 in a vehicle (not shown). The report includes a bus identifier indicating that the current report is a defect report, and a data portion in which the defect report is contained.

The check-control module recognizes the defect report from the control unit on the basis of the bus identifier, and transmits the defect report contained in the data portion to a memory 19 which has stored therein a table 19a containing information pertaining to each defect report from any control unit 10 to 14. This information may comprise text data, assigned graphic symbols, activations of indicator lights or even reporting action. The table 19a may be reconfigured at any time and may then again be read into the memory. This structure is therefore selected to be very open because new information can be filed, supplemented, changed, etc. for each defect report. New defect reports can also easily be added.

The information assigned to a respective report is transmitted back to the check-control module 15 which causes the emission of the information to an indicating device 17. In this case, lights may then flash at the indicating device 17 or an output by way of a display may take place. Symbols or text information can also be displayed in the display.

Figure 2:
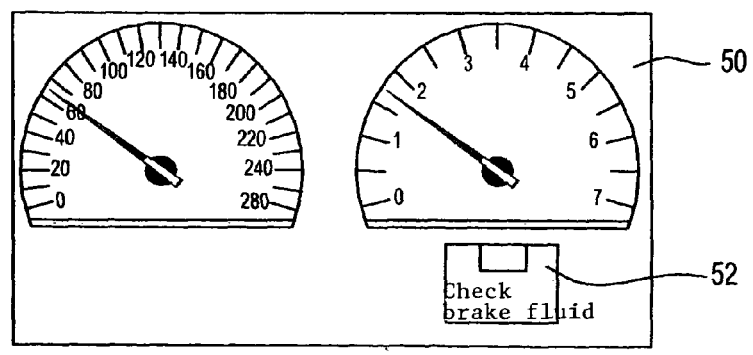
FIG. 2 is a view of an indicating device for illustrating information regarding a report from a control unit.
Figure 2:
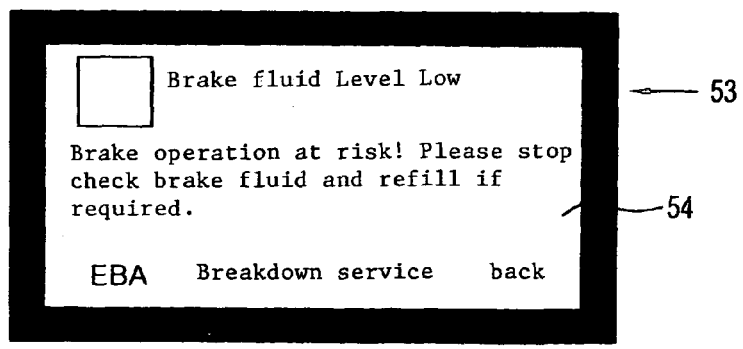

An indicating device used in the present embodiment is illustrated in FIG. 2. On the one hand, it comprises an essentially conventional combination indicating device 50 into which a small display 52 is integrated. In the display 52, symbols and brief information can be displayed, corresponding to the information read out of the table. On the other hand, another video screen 53 is provided which, in addition to a symbol, may show additional text information 54, which can be retrieved. In the case of particularly serious defects, the data automatically appear on the additional video screen 53.

In this manner, the driver's attention can first be drawn to the presence of a defect by an indication in the combination indicating device 50. The defect will then be explained in greater detail on the video screen 53 which is, for example, arranged in the dashboard.

As mentioned above, the table can be prepared in an advantageous manner by means of a data bank in which the pertaining report texts, reporting actions or graphic symbols are assigned to each defect report. After the preparation of such a data bank 30, for example on a PC, a machine-readable code 32 can be generated which can be read into the memory 19.

Similarly, a source data file 34 can be generated which is then linked in a separate unit 36 with the program portion for controlling the check-control module and, together in this program unit, is played into the memory 19 of the instrument cluster 23 (for example, flash programming by way of the diagnostic interface).

A manual input 31 is required for preparing the data bank 30.

By means of the present invention, all active check-control reports can be indicated by way of a monitor. With respect to each check-control report, a supplementary instruction for action can also be displayed. Particularly in the case of high-priority check-control reports, the supplementary instructions for action can automatically be faded in.

Since the check-control module need know neither the defect reports nor the information to be indicated, it can be kept very simple and general. It can therefore be adapted for use in various vehicle types simply by a change or exchange of the table.

The defect reporting system according to the invention can process a large number of check-control reports and, is highly scalable. Once a check-control algorithm is programmed, it can be used without change in various vehicle types, because the adaptation to new vehicle types takes place by an expansion or exchange of the table. In particular, it is also possible to install control units subsequently in an automobile, without having to change the program code of the check-control module, because the table needs only be expanded by several inputs.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An operational status reporting system for a vehicle having at least one local electronic control unit for controlling operation of a vehicle system associated therewith, said reporting system comprising:

a check-control module which is connected via a data line with, and receives report information from, the at least one local control unit which is associated with said vehicle system; and an indicating device which is connected with the check-control module for displaying at least one message as a function of the report information; wherein, the at least one local control unit is situated separate from the check-control module, and contains a further unit for performing processing for diagnostic testing of said vehicle system independently of the check-control module, and, in the presence of predetermined conditions, emitting a corresponding diagnostic report to the check-control module;

hardware and software for performing diagnostic testing are situated solely in said local control unit;

a table is provided in which message information is stored, including at least one message for each diagnostic report; and the check-control module is connected with the table, and reads the at least one message assigned to the diagnostic report out of the table and displays it via the indicating device.

2. The system according to claim 1, wherein the reports are transmitted in a defined data format.

3. The system according to claim 2, wherein the data format contains a data format identifier and a report information.

4. The system according to claim 1, wherein the table has stored therein at least one of: texts, graphic information, control light activations and reporting action for each report.

5. The system according to claim 1, further comprising a memory in which the table is stored in a machine-readable form.

6. The system according to claim 5, wherein the table can be read into the memory.

7. The system according to claim 5, wherein the memory is integrated in the check-control module.

8. The system according to claim 5, wherein the memory and the check-control module are integrated in a vehicle instrument cluster.

9. The system according to claim 1, further comprising a memory in which the table and a program controlling the check-control module are jointly stored.

10. The system according to claim 9, wherein the table and the program can jointly be read into the memory.

11. The system according to claim 1, wherein the table is prepared by means of a data bank.

12. A method for reporting operational status information in a vehicle having a plurality of local control units for controlling operation of associated vehicle systems, and a check-control module which is coupled via a data communication link with the local control units, said method comprising:
   a local control unit associated with a particular vehicle system, and situated separate from the check-control module, performing diagnostic processing of operating information characterizing operation of a said particular system, for diagnostic testing of said particular system, independently of said check-control module, to detect occurrence of predetermined conditions indicative of a particular operational status of said particular vehicle system;
   upon detection of said predetermined conditions, said local control unit sending a corresponding diagnostic report indicating said operational status to said check-control module via said data communication link;
   providing a table that is coupled to said check-control module, said table having stored therein message information regarding said operational status, that is accessible as a function of content of said diagnostic report;
   the check-control module reading at least one message information from said table based on information contained in said diagnostic report; and
   displaying said least one message information;
   wherein, for performing said diagnostic processing, said local control unit uses hardware and software which are situated in said local control unit, and not in said check-control module.

13. The method according to claim 12, wherein said report is transmitted in a format that includes a data format identifier and report information.

14. The method according to claim 13, wherein said data format identifier is common to reports sent by all local control units, and identifies said report as an operational status report.

15. An operational status reporting system for a vehicle having a plurality of local control units for controlling operation of vehicle systems associated therewith, said system comprising:
   a check-control module coupled via a data communication link with each of said local control units;
   processing means associated with each respective local control unit, for performing diagnostic processing of operating information characterizing operation of a vehicle system associated therewith, to diagnose occurrence of predetermined conditions indicative of a particular operational status of said vehicle system, independently of the check-control module, and upon occurrence of said predetermined conditions, sending a corresponding diagnostic report to said check-control module via said data communication link;
   a memory coupled in data communication with said check-control module, and having stored therein a table containing message information that is accessible by said check-control module as a function of content of said diagnostic report; and
   a display device for displaying a message read from said memory by said check-control unit; wherein,
   each local control unit is associated with a different vehicle system, and is situated separate from the check-control module; and
   hardware and software for performing said diagnostic processing are situated in said local control unit, and not in said check-control module.

16. The method according to claim 15, wherein said report is transmitted in a format that includes a data format identifier and report information.

17. The method according to claim 16, wherein said data format identifier is common to reports sent by all local control units, and identifies said report as an operational status report.

18. An operational status reporting system for a vehicle having at least one local electronic control unit for controlling operation of a vehicle system associated therewith, said reporting system comprising:
   a check-control module which is connected via a digital data communication link with, and receives defect report information from, the at least one local control unit, which is associated with said vehicle system; and
   an indicating device which communicates with the check-control module for displaying at least one message as a function of the defect report information; wherein,
   the at least one local control unit is situated separate from the check-control module, and includes a processor performing diagnostic processing of status data which characterize operation of said vehicle system, independently of the check-control module, using stored criteria applicable to the at least one local control unit, and upon detection of the presence of predetermined conditions based on said stored criteria, emits a corresponding defect report to the check-control module; and
   the check-control module reads at least one message assigned to the defect report out of a table and displays it via the indicating device;
   wherein hardware and software for performing said diagnostic processing, as well as said stored criteria, are situated in said local control unit, and not in said check-control module.

19. A vehicle system comprising:
   a plurality of self-evaluating local control units, each of which is associated with and controls operation of a respective vehicle system; and a check-control unit coupled via a digital data communication link with said self-evaluating local control units via a data bus; wherein, each of said self-evaluating local control units is situated separate from the check-control module, and has a processor for receiving and evaluating status data which characterize operational parameters of the respective vehicle system associated therewith;

said processor analyzes said status data and determines an operating condition of said vehicle system, based on stored operational criteria, independently of the check-control module, using hardware and software contained in said local control unit, and not in the check-control module;

when said processor determines that a defect exists in said vehicle system, the self-evaluating local control unit of which it is a part sends a defect report to said check-control unit via said data bus, said defect report indicating a nature of said defect determined by said processor; and as a function of said defect report, said check-control unit causes a message to be displayed on a display unit, said message providing information regarding said defect.

20. The method according to claim 19, wherein said report is transmitted in a format that includes a data format identifier and report information.

21. The method according to claim 20, wherein said data format identifier is common to reports sent by all local control units, and identifies said report as an operational status report.

* * * * *